United States Patent [19]

Jackson

[11] Patent Number: 4,895,640

[45] Date of Patent: Jan. 23, 1990

[54] METHOD FOR REMOVING IMPURITIES AND RESIDUAL MOISTURE FROM PETROLEUM FUELS

[76] Inventor: Herman R. Jackson, 1550 Selva Marina Dr., Atlantic Beach, Fla. 32233

[21] Appl. No.: 308,591

[22] Filed: Feb. 10, 1989

[51] Int. Cl.$^4$ ............................................. C10G 33/04
[52] U.S. Cl. .................................. 208/188; 208/219; 210/799; 210/243
[58] Field of Search ............... 208/187, 188, 219, 243; 210/343, 799, 807

[56] References Cited

U.S. PATENT DOCUMENTS 4,077,878  3/1978  Jackson .......................... 210/282 X
4,211,639  7/1980  Jackson ............................... 208/188

Primary Examiner—Charles Hart
Attorney, Agent, or Firm—Sughrue, Mion, Zinn, Macpeak & Seas

[57] ABSTRACT

A method for removing impurities and residual moisture from a petroleum fuel comprising:
(a) circulating said fuel through a first filter apparatus made up of a cellulosic material containing a solid organic acid and a chromate compound; and
(b) circulating said fuel from step (a) through a second filter apparatus containing a cellulosic material containing water; and
(c) during steps (a) and (b) maintaining an electric grounding of said first filter apparatus via a DC power supply placed in between said first and second filters.

8 Claims, 1 Drawing Sheet

METHOD FOR REMOVING IMPURITIES AND RESIDUAL MOISTURE FROM PETROLEUM FUELS

BACKGROUND OF THE INVENTION

1. Field of the Invention

The present invention concerns reducing the emissions produced on burning fuel oils, gasolines or diesel fuels in automobile engines. More particularly, the present invention concerns reducing these emissions by pretreating the fuel prior to burning by removing sulfur therefrom as well as residual moisture and other residual reducing agents.

2. Description of the Prior Art

Presently, many of the efforts to reduce the air pollution produced by the automobile engine have centered around treating the exhaust rather than pretreating the fuel to reduce the toxic emissions. The catalytic converter, for example, treats the engine exhausts immediately before releasing them to the atmosphere. Many pollution control systems also rely upon recirculating the engine exhaust back to the engine for a "second burn" before releasing them to the atmosphere to reduce pollutants. Until the inventor's U.S. Pat. No. 4,211,639 the prior art did not provide a suitable treatment for the fuel itself, prior to burning, whereby the toxic emissions could be held to a minimum.

U.S. Pat. No. 4,211,639 provided a treatment for petroleum fuels, such as crude oil, gasoline, jet fuel, diesel fuel, fuel oils and like petroleum products, whereby the toxic emissions produced on burning those materials are reduced.

In U.S. Pat. No. 4,211,639, petroleum fuels are treated with a solid acid and a chromate compound, whereby sulfur and other residual impurities are removed, with the result that toxic emissions, such as carbon monoxide and hydrocarbons, can be reduced. While the explanation as to how these toxic emissions are reduced is not completely clear, sizable reductions in carbon monoxide and hydrocarbon emissions have been observed.

The present invention is an improvement on the emissions - reducing method disclosed in U.S. Pat. No. 4,211,639.

Accordingly, it is the principal object of the present invention to provide an improved treatment for petroleum fuels, such as crude oil, gasoline, jet fuel, fuel oils, and like petroleum products, whereby the toxic emissions produced on burning those materials are reduced.

SUMMARY OF THE INVENTION

The above-mentioned principal object of the present invention is achieved by providing A method for removing impurities and residual moisture from a petroleum fuel comprising:

(a) circulating said fuel through a first filter apparatus made up of a cellulosic material containing a solid organic acid and a chromate compound; and (b) circulating said fuel from step (a) through a second filter apparatus containing a cellulosic material containing water; and (c) during steps (a) and (b) maintaining an electric grounding of said first filter apparatus via a DC power supply placed in between said first and second filters.

DESCRIPTION OF ONE EMBODIMENT

Figure 1:
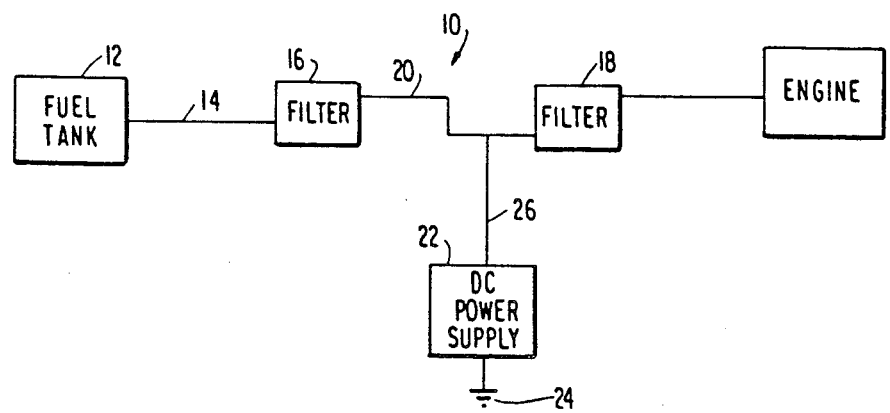
FIG. 1 is a schematic diagram which illustrates a one fuel treatment system based on the present invention.

Generally, the present invention is applicable to any type of petroleum fuel product: fuel oils (including number a through number b fuel oils) diesel fuel, jet fuel, gasoline and like products. The present invention is particularly applicable to gasolines in the form they are generally supplied to the consumer regardless of their octane rating and whether they be lead-free or not.

One embodiment of the present invention is illustrated in FIG. 1. As will become more clear from the discussion which follows, this embodiment is a two-filter arrangement where the solid acid and chromate compound are contained in the first filter canisters.

The second filter is made up of a cellulosic material and contains water, which acts as a moderator. In between the two filters is a D.C. power supply which acts as a ground.

Referring now to FIG. 1, the system itself is designated 10, the fuel tank 12 is provided with fuel line 14. The unit also includes a conventional fuel pump (not shown). A first filter assembly 16 is incorporated in the system 10 for containing the fuel with the solid acid and chromate compound. The construction of the filter assembly is not critical, the essential requirement being that the filter either be constructed of a cellulose material or contain some cellulose material, such as the cotton bag discussed below, to provide an arrangement whereby the fuel may pass through the filter assembly and contact the solid acid and chromate without substantially removing the compounds from the assembly. Generally, the filter may be cylindrical in form and constructed of an imperforate casing having a filter container inlet and a filter container outlet.

Filter 16 is interconnected to the fuel tank via fuel line 14 and to filter 18 via the portion of fuel line designated 20. After contacting the solid acid and chromate compound in the filter 16, the fuel circulates out of filter 16 to conduit 20 where it is carried to filter 18. Filter 18 is made up of a cellulosic material and contains water. The water acts as a moderator: the greater the content of deuterium oxide ($D_2O$, heavy water) in the water, the more efficient the moderation. From there, the fuel passes to the engine (as shown in FIG. 1) or to a fuel burner.

Again, the construction of the filters is not critical, it only being necessary that the arrangement permit the fuel to contact the compounds without carrying substantial portions of the compound into the fuel line and, as discussed below, that the filter be provided with some cellulosic material.

In accordance with the present invention, the filter system must be grounded. When the filters are formed of a metallic material, the ground may be accomplished automatically by the contact between the filter and the metal in the car. Of course, the filter assemblies themselves can be grounded directly. If the filter containers are plastic or constructed of some non-conductive material, the ground can be established by having the wire lead from some metallic point on the car into the inside of the filter container. FIG. 1 shows that embodiment of the present invention wherein the filters are metallic and the assembly is grounded via a DC power supply 22. The positive terminal of the DC power supply is connected to wire 24 leading to the ground and the negative terminal is connected to the filter by wire 26.

Electrical circuit breakers 27 and 28 are placed, respectively, in front of first filter 16 after filter 18.

It is essential that the filter(s) contain some cellulosic material.

The chromate compound and solid acid may be placed inside the filter canisters in a bag made of a permeable cellulosic material such as cotton cloth. The cellulosic container device described in the inventor's U.S. Pat. No. 4,077,878 relating to cleaning drycleaning solvents may also be used in the filter. In the alternative, the filter itself may be constructed of cellulosic board.

In the present invention, an unsubstituted aromatic hydrocarbon or a halogen- or alkyl-substituted aromatic hydrocarbon having a boiling point between about 78° and 250° C. may optionally be added to the fuel. Typical examples of suitable unsubstituted aromatic hydrocarbons are benzene and naphthalene. Suitable alkyl-substituted aromatic hydrocarbons are lower alkyl, preferably methyl- or ethyl-substituted aromatic hydrocarbons, such as xylene, toluene, and the like. Further, suitable halogen-substituted aromatic hydrocarbons are chlorobenzene and the like. However, the present invention is expressly applicable to those compounds satisfying the above property, although not specifically enumerated in the present specification. Those of ordinary skill in the art, with a minimum degree of experimentation, are certainly able to practice the present invention using aromatic compounds having the necessary boiling point but not specifically identified herein, according to the end use desired.

Generally, the amount of the above-identified aromatic compound which is incorporated into the fuel varies from 3 liquid ounces to 1 gallon of aromatic compound per 100 gallons of fuel. The particular amount of a specific aromatic hydrocarbon may vary within this range, depending upon the aromatic hydrocarbon selected; however, an amount of aromatic hydrocarbon within this range is generally suitable for the purposes of the present invention.

The chromate compound used in the present invention is preferably barium chromate: however, the chromates and dichromates of sodium, potassium, barium and lead are representative. The amount of chromate compound contained in the first filter is not critical. One of the advantages of the present invention is that practically any amount of chromate compound will remain active for the life of an automobile or other burner. This is because the amount of residual moisture and impurity in the fuel is small in comparison to the amount of chromate compound which can be held in the filter arrangement and only the residual moisture in the fuel dissolves the chromate compound.

The solid acids which are particularly preferred for use within the present invention are fumaric acid and oxalic acid. Generally, however, any solid organic acid may be used within the present invention. Representatives of solid organic acids are citric acid, fumaric acid, oxalic acid, ascorbic acid, and tartaric acid. All of these acids are suitable for use within the described first filter. The amount of acid is not critical.

As indicated above, the present invention also requires the presence of a cellulosic material device in the filters. The cellulosic bag device described above comprises a cellulose material which can be folded upon itself so as to be closed and thereby form a bag. Cotton cloth is a good example of one such cellulosic material. However, the skilled artisan could construct the cellulosic bag out of any available cellulosic fabric. The mixture of acid and chromate compound may be contained within the bag directly or precipitated upon a second piece of cellulosic material which is placed in the cellulosic bag. Bags of this type are described in the inventor s U.S. Pat. No. 4.077.878. which is incorporated herein by reference. If the mixture of chromate and acid is contained within the cellulosic bag, as described above, the ground can be established by attaching a copper wire to the cellulosic bag within the filter apparatus. If the filter apparatus is metallic, the ground is established by merely allowing the copper wire attached to the cellulosic bag to contact the insides of the filter container. However, if the filter container is not metallic, the ground can be established by connecting the wire attached to the cellulosic bag directly to a ground.

The present invention can also be practiced using a DC power supply. When the aromatic hydrocarbon added to the fuel is napththalene, the DC power supply is not necessary. However, even when naphthalene is used, the DC power supply will not detract from the advantages obtained in accordance with the present invention. When a DC power supply is used, the negative terminal of the power supply is connected to the system in between the first and second filters, and the positive terminal of the power supply is connected to a ground.

It has been determined that by adding the aromatic hydrocarbon to the fuel and contacting the fuel with a solid acid and a chromate compound as in the present invention, the sulfur and residual moisture in the fuel are effectively removed.

It is believed that the chromates used in the present invention ionize and absorb the residual water in the fuel and remove sulfur compounds from the fuel by oxidizing the same to sulfite or sulfate.

It is also believed that the water in the second filter acts as a moderator.

The above description should not be taken as limiting the present invention to the actual embodiments specifically disclosed, but should be deemed to describe the equivalence thereof which may be employed in the practice of the present invention. Those of ordinary skill in the art may make suitable modifications of the present invention, according to the above description without departing from the scope thereof.

What is claimed is:

1. A method for removing impurities and residual moisture from a petroleum fuel comprising:
    (a) circulating said fuel through a first filter apparatus made up of a cellulosic material containing a solid organic acid and a chromate compound: and
    (b) circulating said fuel from step (a) through a second filter apparatus containing a cellulosic material containing water: and
    (c) during (a) and (b) maintaining an electric grounding of said first filter apparatus via a DC power supply placed in between said first and second filters.

2. The method of claim 1 wherein said acid is selected from the group consisting of citric acid, fumaric acid, oxalic acid, ascorbic acid and tartaric acid.

3. The method of claim 2 wherein said solid acid is selected from the group consisting of oxalic acid and fumaric acid.

4. The method of claim 1 wherein said chromate compound is barium chromate.

5. The method of claim 1 wherein said solid organic acid and chromate compound is contained in a permeable cotton bag having one end of a wire connected thereto, the other end of said wire being directly or indirectly in contact with an electrical ground.

6. The method of claim 1 wherein said fuel is a fuel oil, diesel fuel, crude oil or gasoline.

7. The method of claim 1 wherein said fuel is a No. 2 through No. 6 fuel oil, gasoline or jet fuel.

8. The method of claim 1, wherein the cellulosic material is dampened with water having a high deuterium oxide content.

* * * * *